United States Patent [19]

Neumiller

[11] 3,918,952

[45] Nov. 11, 1975

[54] HIGH ANALYSIS CLEAR LAWN FERTILIZER SOLUTION

[75] Inventor: Phillip J. Neumiller, Racine, Wis.

[73] Assignee: I. C. Johnson & Son, Inc., Racine, Wis.

[22] Filed: Mar. 15, 1974

[21] Appl. No.: 451,613

[52] U.S. Cl. .......................... 71/28; 71/29; 71/30; 71/34; 71/64 C; 71/DIG. 2
[51] Int. Cl.² .. C05C 9/00; C05B 15/00; C05B 7/00
[58] Field of Search ............. 71/28, 29, 30, 49, 51, 71/61, 64 C, 34, DIG. 2

[56] References Cited
UNITED STATES PATENTS 2,770,538  11/1956  Vierling ................................ 71/29
3,640,698  2/1972  Bocklund ......................... 71/64 C X
3,711,269  1/1973  Curless ............................ 71/64 C X

*Primary Examiner*—Frank A. Spear, Jr.
*Assistant Examiner*—Ferris H. Lander

[57] ABSTRACT

A high nitrogen containing clear liquid fertilizer including phosphorous and potassium in a ratio suitable for use as a lawn fertilizer wherein the solution has a pH within the range of from 7.5 to 8.7 and has a cloud point of less than 45°F and a clearing point of less than 65°F. The liquid lawn fertilizer composition is quite stable over an extended period of time even when subjected to repeated freeze-thaw conditions.

9 Claims, No Drawings

HIGH ANALYSIS CLEAR LAWN FERTILIZER SOLUTION

BACKGROUND OF THE INVENTION

This application relates to a high analysis, stable liquid fertilizer composition. More particularly, this invention relates to a clear stable liquid fertilizer composition having high nitrogen analysis particularly suited for use in fertilizing lawns.

The utilization of liquid fertilizers for agricultural purposes has increased enormously over the past decade since liquid fertilizers can incorporate chelated and solubilized micronutrients often necessary for specific applications. Furthermore, liquid fertilizers in general offer the advantage in bulk form that they can be mixed and, accordingly, tailored to the specific needs of a particular agricultural consumer.

However, liquid fertilizers have not achieved widespread acceptance for small scale consumer uses, such as fertilizers for lawns or small family gardens. One of the reasons for this lack of interest in liquid fertilizers by consumers who would use small amounts is the poor storage stability of these materials often necessitating almost immediate blending and application so as to take advantage of the liquid form. Furthermore, the most common liquid fertilizer forms available are not in the proper nutrient ratio or at the proper levels for home lawn and garden use. Lawn grasses generally require a high percentage of nitrogen to be applied throughout the growing season, and generally, fertilizers specifically tailored for lawn use contain a nutrient level ratio of 3-1-1 or 4-1-1 or higher. Many of the commercially available types of solid lawn fertilizer are available in ratios of 23-7-7 or 22-6-2 or similar high nitrogen containing ratios.

While high nitrogen content is necessary for a good lawn fertilizer, some form of potassium and phosphorous also must be present so as to insure a balanced application of nutrients to the soil. Furthermore, in certain applications it is also desirable to incorporate chelated iron and other micro-nutrients in a lawn food product.

Although in the past there have been some attempts to produce high nutrient level liquid fertilizers containing a high nitrogen content, many of these products are in the form of clay or other similar colloidal suspensions and are not in a clear or solvent-soluble solution. Although the suspension or emulsion tends to increase the storage stability of these liquid fertilizers, these products must be shaken or agitated so as to insure an even distribution of the nutrients throughout the liquid suspension prior and sometimes during use. Often this negates the convenience of a liquid type product. Furthermore, many of these suspensions or emulsions are not stable when subjected to freezing conditions and completely come apart upon thawing.

However, in view of the basic simple application techniques to be utilized with a liquid fertilizer and the relatively wide flexibility presented utilizing such products, there has been a great deal of interest in preparing liquid fertilizer compositions which would be suitable for home consumer use. Desirable features of these fertilizers would be a reasonable storage stability both under ambient conditions and under conditions of freezing and thawing with the product being homogeneously maintained in solution or suspension so that agitation prior to use and during use is not required.

Lastly, it is desired that a tracer of some sort, such as disclosed in U.S. Pat. No. 3,096,168, be utilized in conjunction with both liquid and solid fertilizers so that the consumer, upon applying the product on the grass, can immediately tell which surfaces have been treated so that no missed spots occur and an even application of the fertilizer can be made.

BRIEF DESCRIPTION AND OBJECTS

It is within the above background and environment that the fertilizer composition of the present invention was developed. Briefly, the fertilizer of the present invention comprises a high analysis, high nitrogen containing, stable, clear solution containing up to 21 percent nitrogen, five percent phosphorous and five percent potassium in a composition having a pH within the range of from 7.5 to 8.7.

Also a process for producing a clear liquid fertilizer composition of the present application comprises combining the ingredients to form the proper analysis fertilizer adding sufficient ammonium hydroxide to the mixture to provide the proper pH in a closed vessel, stirring and heating the ingredients at 130°F until a clear solution is obtained and cooling the solution to room temperature prior to opening the closed vessel.

It is, therefore, the primary object of the present invention to provide a clear stable fertilizer composition.

It is a further object of the present invention to provide a liquid fertilizer composition which is exceptionally stable and suitable for use for fertilizing lawns.

It is still a further object of the present invention to provide a lawn fertilizer which provides a foam tracer on the lawn as the same is utilized so as to prevent missed spots.

It is still a further object of the present invention to provide a process for producing a clear liquid lawn fertilizer of the present invention.

Still further objects and advantages of the composition and processes of the present invention will become more apparent from the following more detailed description thereof.

DETAILED DESCRIPTION OF THE INVENTION

The composition of the present invention more particularly comprises a high analysis, clear liquid fertilizer which has a pH within the range of from 7.5 to 8.7 and comprises from 0 to 9 percent potassium chloride, 15 to 42 percent urea, 0.3 to 5.0 percent, by weight, surfactant, 0 to 1.0 percent of a chelating agent, 10 to 30 percent of ammoniated polyphosphate, 2 to 15 percent, by weight, of an alkanol, from 0.25 to 3 percent ammonium hydroxide and from 30 to 55 percent water and dyes.

The process of the present invention comprises combining the potassium chloride, urea, surfactant, EDTA salt, dyes, water, ammoniated polyphosphate, alcohol and ammonium hydroxide in a closed vessel, stirring the ingredients and heating the ingredients while being stirred to 130°F until a clear solution is obtained, and cooling the solution to room temperature before opening the closed vessel.

The preferred compositions of the present invention have a cloud point, which is defined as the temperature at which the solution starts to become cloudy of less than about 50°F and preferably less than about 45°F. These compositions also should have a clearing point, defined as the temperature upon heating at which the cloudy composition becomes clear of less than 65°F and preferably less than 60°F. The compositions should also be sufficiently freeze-thaw stable so as to withstand at least two complete cycles without becoming unstable.

As noted above, the stable clear liquid fertilizer composition includes a surfactant material. Although surfactants have been disclosed for use with liquid fertilizers such as in U.S. Pat. No. 2,869,996 which discloses a liquid fertilizer plus surfactant for leaf-feeding, and U.S. Pat. No. Re. 25,394, neither of these above patents, however, discloses nor suggests that the surfactant, when present, could be utilized as a foam tracer for the fertilizer, since the high amount of salts ordinarily present in a liquid fertilizer composition tend to completely destroy the foam capacity of most surfactants. Furthermore, none of the liquid fertilizer compositions disclosed in the above references set forth that the fertilizers have a high nitrogen content nor are the compositions completely stable both with regard to long term storage and freeze-thaw stability.

The composition of the present invention includes urea and ammonium hydroxide as a source of nitrogen as well as ammoniated polyphosphate. Although any commercially available form of urea can be utilized, it is preferred to utilize an uncoated substantially pure urea since this material is more readily solubilized and does not contain additional coatings, clays or other materials which could interfere with the solution characteristics of the composition of the present invention. To produce stable fertilizers having high nitrogen content, from 15 to 42 percent by weight urea should be used. It is furthermore preferred to use 30 to 40 percent urea with 39 to 40 percent being most preferred.

Furthermore, the utilization of ammonium hydroxide as opposed to either sodium or potassium hydroxide ordinarily utilized for pH control in fertilizer compositions is essential since the ammonium hydroxide not only acts as a tertiary source of nitrogen which is readily available as the ammonium ion, but also acts as a stabilizer for the entire fertilizer composition. On the other hand, potassium and sodium hydroxide tend to have an unstablizing effect on the composition of the present invention and, accordingly, are generally not suitable for use. Generally, the ammonium hydroxide is present in the composition in an amount sufficient to control the pH within the range of from 7.5 to 8.7, this normally requiring from 0.25 to 3 percent by weight and preferably from 0.5 to 1.5 percent ammonium hydroxide.

The composition of the present invention includes ammoniated polyphosphate as a primary source of nitrogen and phosphorous. The ammoniated polyphosphate which is defined as the reaction product of ammonia with superphosphoric acid as disclosed in U.S. Pat. No. 3,558,300, may be added to the composition of the present invention as ammoniated polyphosphate or may be formed in situ by substituting the proper amounts of ammonia and superphosphoric acid for the ammoniated polyphosphate in the reaction vessel prior to heating. It is generally desirable that the ammonium polyphosphate be present in the composition of the present invention in an amount from 10 to 30 percent, by weight, and preferably from 10 to 20 percent with the optimum percentage being 13.5 for an ammonium polyphosphate having an analysis of 11–37–0 in order to produce a liquid fertilizer having a final analysis of 20–5–2.

As the source of potassium in the fertilizer composition of the present invention, potassium chloride is utilized. Potassium chloride, although introducing a source of chlorine into the composition of the present invention, is the only source of potassium suitable for use in the composition of the present invention since other potassium sources have a deliterious effect on the stability of the clear liquid composition. As noted above, potassium hydroxide is not suitable for use since this leads to composition instability while potassium nitrate, another commonly used source of potassium, adversely effects the solubility and freeze-thaw characteristics of the composition of the present invention. The potassium chloride is present in the composition of the present invention when potassium is desired in an amount from 0 to 9 percent, by weight, preferably from 1 to 7 percent, and most preferably from 1.5 to 3.5 percent.

As the surfactant in the composition of the present invention, a relatively limited number of commercially available surfactants may be utilized. Although most anionic surfactants produce an adequate foam level upon spraying, many of these surfactants form unstable solutions which stratify or form precipitates on standing or affect the freeze-that stability. The preferred class of surfactants are the $C_{12}$–$C_{20}$ alkyl sulfate salts of sodium, potassium or ammonium with sodium lauryl sulfate being most preferred since this surfactant produces both the desired stability and foaming characteristics of the composition of the present invention. Examples of these alkyl sulfate salts include potassium lauryl sulfate, ammonium lauryl sulfate, sodium myristyl sulfate, ammonium myristyl sulfate, sodium palmityl sulfate, sodium coco sulfate, sodium stearyl sulfate, etc.

In order to improve the foam stability, lower the cloud point and improve the freeze-thaw stability of the compositions of the present invention, it is preferred to mix alkyl sulfate salt with an anionic N-alkyl-sarcosinic acid or alkali metal salt or a sulfosuccinic acid derivative in a ratio of sulfate to anionic of 0.75:1 to 2:1. Suitable sulfo-succinate derivatives are listed in McCutcheon's 1973 North American Edition of "Detergents and Emulsifiers" and include the sodium, potassium and ammonium salts of esters, half-esters, amides and half-amides formed from sulfosuccinic acid and triethanolamine, diethanolamine, monoethanolamine, higher alkanols having from 4 to 20 carbon atoms, and $C_{12}$–$C_{20}$ alkanoyl modified alkanolamides such as lauroylmonoethanolamide.

A variety of other surfactants, although not as preferred as the above surfactants because of poor foaming or the formation of a small amount of precipitate, will produce reasonably stable systems, and include the various betaine surfactants and most nonionic polyethyoxylated oils or fats as well as ethoxylate alkyl sulfates.

The total surfactant content of the composition of the present invention should be from 0.3 to 5.0 percent by weight to insure adequate foaming and composition stability. It is preferred to utilize a mixture of an alkyl sulfate salt and at least one additional anionic surfactant having a combined content of from 0.5 to 3.0 percent.

The composition of the present invention may optionally include small amounts of a conventional chelating agent such as ethylene diamine tetracetic acid di-sodium or tri-potassium salt.

The composition of the present invention also includes a lower alkyl alcohol having 1 to 4 carbon atoms such as methanol, ethanol, normal propanol and normal butanol. The preferred alcohol, both with regard to performance and toxicology, is normal propanol, although normal butanol forms a stable solution with adequate foaming. For proper performance and stability, the alcohol should be present in a concentration of 1–15 parts by weight. The preferred concentration of alcohol is from 2–10 parts by weight.

The composition of the present invention also includes from 30 to 55 percent by weight water and preferably from 33 to 40 percent. The water used is preferably deionized water, which removes any interfering ions although tap water of reasonable degree of hardness may be used.

The liquid fertilizer composition of the present invention may also optionally include a small amount, i.e., up to 5 percent, of various micronutrient materials. Included among these are iron, copper, magnesium, boron, zinc, cobalt, molybdenum, manganese, and calcium. These materials usually are present in the form of water soluble salts. When iron is to be utilized, it is preferred that the iron be incorporated in the form of iron sulfate heptahydrate.

In addition to the above micronutrients, up to 5 percent of various herbicides may be incorporated as optional materials in the composition of the present invention. Some care must be utilized in incorporating herbicides into the solution of the present invention since at some percentages the stability is slightly decreased. However, with regard to various herbicides such as 2-methyl-4-chlorophenoxyacetic acid (MCPA), 2(2-methyl-4-chlorophenoxy) proprionic acid (MCPP), 2,4-dichlorophenoxyacetic acid (2,4-D) and 3,6 dichloro-o-anisic acid (Dicamba).

The fertilizer composition of the present invention may be preferably prepared by agitating the composition mixture in a closed or air tight vessel at an elevated temperature for sufficient time so as to produce a clear solution.

More particularly, the process comprises mixing the components of the fertilizer composition in a vessel and adding sufficient ammonium hydroxide to bring the pH of the composition to between 7.5 and 8.7. The vessel is then closed and the mixture is heated with agitation to a temperature within the range of from 120° to 140°F for from 5 minutes to 1 hour until the solution clears. The mixture is then cooled in the vessel without opening until the mixture is at a temperature of from 60° to 80°F.

As noted above, the ammoniated polyphosphate may be added as is or formed in situ by adding to the initial mixture the appropriate amounts of ammonia and superphosphoric acid.

The preferred method for application of the fertilizers of the present application is by spraying, either utilizing a small scale spraying apparatus or utilizing a spray nozzle attached to the hose which dilutes the fertilizer composition and activates the foam properties of the surfactant incorporated with the composition of the present invention. By utilizing a hose sprayer which activates the foam tracer, the composition of the present application can be easily and conveniently applied to small areas, such as lawns, in an even manner without creating missed or bare spots. The general application rate for the compositions of the present invention is between 0.5 and 2.0 pounds of available nitrogen per 1000 sq. ft.

The composition and process of the present application will now be more fully illustrated by the following examples wherein all parts and percentages are by weight and all temperatures in degrees Farenheit.

EXAMPLE 1

A clear lawn fertilizer composition having an analysis of 20–5–2 is prepared from the following materials:

|  | PARTS BY WEIGHT |
| --- | --- |
| Potash KCl | 3.2 |
| Urea | 39.5 |
| Sodium Lauryl Sulfate | 0.2 |
| Maprosyl L | 0.4 |
| Monamate CPA-40 | 0.4 |
| n-Propanol | 2.5 |
| 11-37-0 Ammoniated Polyphosphate | 13.5 |
| Ammonium Hydroxide | 1.25 |
| Water | 39.05 |
| Dyes | Trace |

The potash potassium chloride, urea, sodium lauryl sulfate and other surfactants, along with the dyes, were charged to an air-tight vessel equipped with a stirrer. The deionized water was added at room temperature and agitation was initiated. During agitation, the normal propanol and the ammoniated polyphosphate were added with continued agitation. The ammonia was then added to the above mixture and the vessel was closed and pressure sealed. The mixture was then agitated and heated up to a temperature of 130°F until the solution clears. The mixture was then allowed to cool to room temperature in the kettle before opening or pumping out the materials.

The formulation above had a final pH of 8.2, a cloud point of from 39° to 42°F and a clearing point of 59°F, a freeze-thaw cycle stability of greater than 15 cycles and shelf-stability of three months at 120°F.

EXAMPLE 2

A clear lawn fertilizer solution having an analysis of 20–5–2 was prepared from the following materials:

| Potash KCl | 3.2 |
| --- | --- |
| Urea | 39.5 |
| Na Lauryl SO₄ | 0.5 |
| Na₂ EDTA | 0.1 |
| Ammoniate Polyphosphate 11-37-0 | 13.5 |
| n-Propanol | 7.0 |
| NH₄OH | 0.75 |
| H₂O | 35.45 |
| Dyes | Trace |

This formulation was stable when processed as in Example 1 and was clear with a cloud point of 47°F and a clearing point of 59°F. The pH of this solution was 7.55.

When the formulations of Examples 1 and 2 were applied to lawns utilizing a hose sprayer nozzle, the formulations produced a traceable foam so as to indicate which areas had been fertilized and also produced a greener looking lawn within a few days.

COMPARATIVE EXAMPLE 1

A clear solution fertilizer having a pH of 8.4 and an analysis of 21–4–2 was prepared from the following formulation:

| | |
|---|---|
| Potash KCl | 3.2 |
| Urea | 42.5 |
| Maprosyl "L" | 0.9 |
| Ammoniated Polyphosphate 11-37-0 | 10.8 |
| n-Propanol | 1.0 |
| $NH_4OH$ | 1.25 |
| $H_2O$ | 40.35 |

This formulation had a cloud point of 49° to 51°F and a clearing point of 59°F and produced good foaming when dispensed from a hose-type nozzle. However, this formulation, which had a high pH and high concentration of nitrogen, was relatively freeze-thaw unstable.

EXAMPLE 3

A high analysis fertilizer composition having the following formulation was prepared as in Example 1.

thaw stability when subjected to freezing for 24 hours followed by thawing for 24 hours, and a repeated cycle.

EXAMPLE 4

A series of fertilizers having an analysis of 20-5-2 were prepared using the procedure of Example 1 having the following formulation wherein the surfactant was varied so as to observe the effect on foaming and stability as shown in Table I.

| | |
|---|---|
| Potash KCl | 3.2 |
| Urea | 39.5 |
| EDTA, Di Sodium Salt | 0.1 |
| Surfactant (see Table I) | 2.0 |
| n-Propanol | 7.0 |
| Ammoniated Polyphosphate 11-37-0 | 13.5 |
| $H_2O$ | 33.95 |
| Ammonium Hydroxide | 0.75 |

TABLE I

| RUN NO. | SURFACTANT [1] | TYPE | FOAM | INITIAL STABILITY | FREEZE-THAW STABILITY (cycles) |
|---|---|---|---|---|---|
| A | Hartamide KL | Nonionic | None | Unstable | 0 |
| B | Monateric Cy-Na50 | Amphoteric | None | Unstable | 0 |
| C | Monamine 779 | Nonionic/Anionic | Good | Unstable | 0 |
| D | Monamate CPA-40 | Anionic | Very Good | Stable | 3 |
| E | Maprosyl L | Anionic | Excellent | Stable | 3 |
| F | Ammonyx LO | Nonionic | Poor | Unstable | 0 |
| G | Maprofix MBO | Anionic | Excellent | Stable | 1 |
| H | Neodol 25-3A | Anionic | Excellent+ | Unstable | |
| I | Ecconol 61 | Anionic | Good | Stable | 1 |
| J | Bio-Terg AS-40 | Anionic | Poor | Unstable | 0 |
| K | Alfonic 1012-60 | Nonionic | Poor | Unstable | 0 |
| L | Alfonic 1412-A | Anionic | Good | Unstable | 0 |
| M | Stepanol ME | Anionic | Good | Unstable | 0 |

[1] Tradenames used. All are listed in McCutcheon's 1973 North American Edition of "Detergent and Emulsifiers" which is incorporated herein by reference.

| | |
|---|---|
| Potash KCl | 3.7 |
| Urea | 39.13 |
| Na Lauryl $SO_4$ | 0.6 |
| Ammoniated Potash 10-34-0 | 14.7 |
| n-Propanol | 7.0 |
| $NH_4OH$ | 1.5 |
| $H_2O$ | 33.37 |
| Dyes | Trace |

EXAMPLES 5–10 and COMPARATIVE EXAMPLES 2–6

Various liquid fertilizer compositions were prepared by utilizing the components in the parts by weight as indicated in Table II. These formula fertilizer compositions were prepared in accordance with the procedure of Example 1.

TABLE II

| COMPOUND | EXAMPLES | | | | | | COMPARATIVE EXAMPLES | | | | |
|---|---|---|---|---|---|---|---|---|---|---|---|
| | 5 | 6 | 7 | 8 | 9 | 10 | 2 | 3 | 4 | 5 | 6 |
| Potash KCl | 1.6 | 3.2 | 3.2 | 3.2 | 3.2 | 3.2 | 3.2 | 3.2 | 3.2 | — | 1.6 |
| Urea | 39.13 | 39.3 | 39.5 | 39.5 | 39.5 | 39.5 | 39.13 | 39.5 | 42.0 | 36.9 | 39.13 |
| 10-34-0 [1] | 14.7 | 14.7 | — | — | — | — | 14.7 | — | — | 30.3 | 14.7 |
| 11-37-0 [1] | — | — | 13.5 | 13.5 | 13.5 | 13.5 | — | 13.5 | 10.8 | — | — |
| $H_2O$ | 37.57 | 34.2 | 39.35 | 38.2 | 38.3 | 33.95 | 35.47 | 39.8 | 40.8 | 20.74 | 27.06 |
| $NH_4OH$ | 1.5 | 1.0 | 1.25 | 1.0 | 1.0 | 0.75 | 1.5 | 1.0 | 1.5 | — | 2.5 |
| n-Propanol | 5.0 | 7.0 | 2.4 | 3.0 | 3.0 | 7.0 | — | — | 0.9 | — | — |
| Na Lauryl $SO_4$ | 0.5 | 0.6 | 0.2 | 0.2 | 0.2 | — | 3.0 | — | — | 4.0 | 4.0 |
| $Na_2$ EDTA | — | — | 0.1 | 0.1 | — | 0.1 | — | — | — | — | — |
| Maprosyl L | — | — | 0.3 | — | — | — | — | 3.0 | 0.8 | — | — |
| Monamate CPA-40 | — | — | 0.2 | 1.3 | 1.3 | — | — | — | — | — | — |
| $NH_4$ Lauryl $SO_4$ | — | — | — | — | — | 2.0 | — | — | — | — | — |
| KOH | — | — | — | — | — | — | — | — | — | 3.33 | — |
| Isopropanol | — | — | — | — | — | — | 3.0 | — | — | 1.0 | — |

[1] Ammoniated Polyphosphate.

This composition had superior foaming, a pH of 82 and a cloud point of 44°F and a clearing point of 59°F. Furthermore, this composition had adequate freeze- Each of the above fertilizer compositions were then observed for initial stability of the solution, freeze-thaw

TABLE III

| | EXAMPLES | | | | | | COMPARATIVE EXAMPLES | | | | |
|---|---|---|---|---|---|---|---|---|---|---|---|
| | 5 | 6 | 7 | 8 | 9 | 10 | 2 | 3 | 4 | 5 | 6 |
| Stability Initial | Stable | Stable | Stable | Stable | Stable | Stable | Stable | Opaque Soln. | Stable | Falls Apart | $NH_3$ Given Off |
| Freeze-Thaw Stability | +15 | 5 | +15 | 5 | 7 | 3 | Unstable | Unstable | Unstable | — | — |
| Cloud Pt. (°F) | 45 | 46 | 41 | 43 | 42 | 47 | 70 | 44 | 45 | — | — |
| Clear Pt. (°F) | 59 | 59 | 59 | 60 | 59 | 58 | 83 | 59 | 61 | — | — | stability of the solution, cloud point and clearing point. The results of these observations are shown in Table III.

The various compositions of Examples 5–10 were all initially stable, forming clear solutions subsequent to cooling after processing, and had good to exceptional freeze-thaw stability with Example 5 remaining in clear solution for +15 cycles of freezing and thawing. Furthermore, the clearing and cloud points of these compositions were sufficiently low so that, under normal room temperature and use conditions, the composition will remain as a clear solution.

On the other hand, Comparative Examples 3, 5 and 6 formed unstable solutions subsequent to processing, and Comparative Examples 2 and 4, although initially stable, were immediately unstable when subjected to freeze-thaw testing.

EXAMPLES 11–14 and COMPARATIVE EXAMPLES 7 and 8

In order to determine the effect of various alcohols on the composition of the present invention, the following 20–5–1 fertilizer formulation was prepared utilizing the alcohols as shown in Table IV, in accordance with the procedure of Example 1.

| | |
|---|---|
| Potash KCl | 1.61 |
| Urea | 39.13 |
| Ammoniated Polyphosphate 10-34-0 | 14.7 |
| Sodium Lauryl Sulfate | 10.0 |
| Alcohol | 5.0 |
| $H_2O$ | 28.56 |
| $NH_4OH$ | 1.00 |

Each fertilizer formulation was warmed to 120°F in a hot water bath with shaking and allowing to stand for one minute. Then the formulation was placed into a 45°F water bath and allowed to stand until precipitating, if any, began. The formulations were ranked from one to six on the amount of precipitate, if any, formed. Examples 13, 14 and Comparative Example 8 had virtually no precipitate present. Examples 11 and 12 had a slight amount of precipitate present, while Comparative Example 7 has a considerably amount of precipitate. These formulas were also ranked as to the amount of foam produced with Examples 11, 12, 13 and Comparative Example 7 producing a good amount of foam and Example 14 and Comparative Example 8 producing virtually no foam.

TABLE VI

| EXAMPLE | ALCOHOL | PRECIPITATE POINT RANKING | FOAM RANKING |
|---|---|---|---|
| 11 | Methanol | 4 | 1 |
| 12 | Ethanol | 5 | 4 |
| 13 | n-Propanol | 3 | 2 |
| 14 | n-Butanol | 1 | 5 |
| Comp. 7 | Isopropanol | 6 | 3 |
| Comp. 8 | Cyclohexanol | 2[1] | 6 |

[1] Separated into two layers.

EXAMPLES 15 and 16 and COMPARATIVE EXAMPLES 9–13

In order to show the criticality of the pH of the final fertilizer formulation of the present invention, the following fertilizer composition having a 20–5–2.3 analysis was prepared:

| | |
|---|---|
| Potash KCl | 3.7 |
| Urea | 39.5 |
| Sodium Lauryl Sulfate | 0.6 |
| n-Propanol | 7.0 |
| Ammoniate Polyphosphate 11-37-0 | 13.5 |
| $H_2O$ plus $NH_4OH$ | 35.7 |

In the above formula, the amount of ammonium hydroxide was varied so as to obtain the desired pH as shown in Table V.

TABLE V

| EXAMPLE | $H_2O$ | $NH_4OH$ | pH | STABILITY INITIAL | STABILITY 1 WEEK |
|---|---|---|---|---|---|
| Comp. 9 | 35.7 | — | 6.8 | Cloudy | Heavy ppt. |
| Comp. 10 | 35.45 | 0.25 | 7.1 | Clear | ppt. |
| Comp. 11 | 35.33 | 0.37 | 7.2 | Clear | Some Floc |
| Comp. 12 | 35.2 | 0.5 | 7.3 | Clear | Some Floc |
| Comp. 13 | 33.7 | 2.0 | 9.1 | Clear | Ammonia Release |
| 15 | 34.7 | 1.0 | 7.9 | Clear | Clear |
| 16 | 34.95 | 0.75 | 7.5 | Clear | Clear |

Although all the formulations, except Comparative Example 9, which contain no ammonia appeared initially clear, precipitate or ammonia release resulted in those formulations not within the pH range as claimed in the present invention. Moreover, the precipitate level decreases as the pH is raised to about 7.5, while if the pH is raised over 8.5 ammonia is released from the composition indicating an unstable solution.

EXAMPLE 17

The following fertilizer composition, which includes some iron as a micronutrient, was prepared in accordance with the procedure of Example 1.

| | |
|---|---|
| Potash KCl | 3.2 |
| Urea | 39.5 |
| Sodium Lauryl Sulfate | 0.5 |
| EDTA, Di sodium Salt | 0.15 |
| $FeSO_4 \cdot 7H_2O$ | 0.25 |
| Ammoniated Polyphosphate 11-37-0 | 13.5 |
| n-Propanol | 7.0 |
| $NH_4OH$ | 0.75 |
| $H_2O$ | 35.15 |

This formulation was quite stable, having a cloud point around 45°F and a clearing point around 60°F, and formed a clear solution having a slightly yellow color. When applied to a lawn utilizing a hose spray nozzle, this formulation left a visible foam tracer.

EXAMPLE 18

A clear fluid fertilizer composition having the following composition and an analysis of 20–5–5 was prepared in accordance with the procedure of Example 1:

| | |
|---|---|
| Urea | 39.5 |
| Potash KCl | 8.1 |
| Sodium Lauryl Sulfate | 1.0 |
| Monamate CPA-40 | 1.2 |
| Lauryl Sarcosinic Acid | 0.4 |
| Ammoniated Polyphosphate 11-37-0 | 13.5 |
| n-Propanol | 2.5 |
| $NH_4OH$ | 1.2 |
| $H_2O$ | 32.6 |

This composition had a pH of 8.1 and was more viscous than lower analysis compositions. The cloud point was 45°F, and the clear point 60°F.

EXAMPLE 19

The following composition was prepared in accordance with the procedure of Example 1:

| | | |
|---|---|---|
| Potash KCl | 3.2 | |
| Urea | 39.5 | |
| Ammoniated Polyphosphate 11-37-0 | 13.5 | |
| $H_2O$ | 39.9 | |
| n-Propane | 1.0 | |
| Lauryl Sarcosinic Acid | 1.0 | |
| Aliphal CD 128 [1] | 0.5 | 0.5 |
| $NH_4OH$ | 1.4 | |

[1] Ammonium salt of sulfated linear primary alcohol ethoxylate.

This composition was a stable, clear solution, both initially and after 5 freeze-thaw cycles. The cloud point was 45°F, and the clear point was 59°F.

EXAMPLE 20

A stable, clear liquid weed and feed composition was prepared as in Example 1:

| | |
|---|---|
| $H_2O$ | 36.8 |
| Potash KCl | 3.2 |
| Urea | 39.5 |
| Na Lauryl Sulfate | 1.0 |
| Lauryl Sarcosinic Acid | 0.4 |
| Monamate CPA-40 | 0.4 |
| n-Propanol | 2.5 |
| Ammoniated Polyphosphate 11-37-0 | 13.5 |
| Dicamba | 1.0 |
| $NH_4OH$ | 1.7 |

This composition had a pH of 8.3, a cloud point of 45°F and a 52°F clear point.

Although the process and composition of the present invention have been illustrated by way of the foregoing examples, the same are for the purpose of illustration only and the composition and process for preparing the same of the present invention are to be limited only by the following appended claims.

I claim:

1. A substantially clear liquid fertilizing composition having a high percentage of available nitrogen consisting essentially of:

| | |
|---|---|
| KCl | 1 to 7 percent |
| Urea | 15 to 42 percent |
| Surfactant | 0.3 to 5 percent |
| Ammoniated polyphosphate | 10 to 30 percent |
| Lower monohydric alcohol | 2 to 15 percent |
| $NH_4OH$ | 0.25 to 2 percent |
| Chelating agent | 0 to 1.0 percent |
| $H_2O$ | 30 to 55 percent. | said surfactant being selected from sodium, potassium or ammonium alkyl sulfates having from 12 to 20 carbon atoms and mixtures of said sulfates with at least one additional anionic surfactant selected from N-alkyl sarcosinic acid, sulfosuccinic acid derivative or mixtures, wherein said alcohol is selected from methanol, ethanol, normal propanol and normal butanol and said chelating agent is selected from ethylene diamine tetracetic acid disodium salt and ethylene diamine tetracetic acid tri-potassium salt, and said composition having a pH within the range of from 7.5 to 8.7.

2. The composition of claim 1 wherein said surfactant is selected from sodium lauryl sulfate, potassium lauryl sulfate and ammonium lauryl sulfate.

3. The composition of claim 2 wherein said surfactant includes lauroyl sarcosinic acid.

4. The composition of claim 2 wherein said surfactant includes a sodium sulfosuccinate ester of a modified ethanolamide.

5. The composition of claim 3 wherein said surfactant includes a sodium sulfosuccinate ester of a modified ethanolamide.

6. The composition of claim 2 wherein said sulfate and said additional anionic surfactant are present in a ratio of 0.75:1 to 2.1.

7. The composition of claim 1 wherein said composition comprises:

| | |
|---|---|
| KCl | 1 to 7 percent |
| Urea | 30 to 40 percent |
| Surfactant | 0.5 to 3.0 percent |
| Ammoniated polyphosphate | 10 to 20 percent |
| Lower monohydric | 5 to 12 percent |
| $NH_4OH$ | 0.5 to 1.0 percent |
| $H_2O$ | 33 to 40 percent. |

8. The composition of claim 1 wherein said composition further includes up to 5 percent of at least one micronutrient salt.

9. The composition of claim 1 which further includes up to 5 percent of a herbicide.

* * * * *

UNITED STATES PATENT OFFICE
CERTIFICATE OF CORRECTION

Patent No. 3,918,952   Dated November 11, 1975

Inventor(s) Phillip J. Neumiller

It is certified that error appears in the above-identified patent and that said Letters Patent are hereby corrected as shown below:

Title page, [73], "I." should be --S.--.

Column 5, line 15, "a" should be inserted before "reasonable".

Column 6, line 56, "dlear" should be --clear--.

Column 7, line 68, "82" should be --8.2--.

Column 9, line 63, "considerably" should be --considerable--.

Claim 7, line 7, insert --alcohol-- after "monohydric".

Signed and Sealed this sixteenth Day of March 1976

[SEAL]

Attest:

RUTH C. MASON
*Attesting Officer*

C. MARSHALL DANN
*Commissioner of Patents and Trademarks*